(12) United States Patent
Weisberg et al.

(10) Patent No.: US 7,299,210 B2
(45) Date of Patent: Nov. 20, 2007

(54) ON-LINE VALUE-BEARING INDICIUM PRINTING USING DSA

(75) Inventors: Seth Weisberg, Los Angeles, CA (US); Craig Leonard Ogg, Long Beach, CA (US)

(73) Assignee: Stamps.com, Los Angeles, CA (US)

( * ) Notice: Subject to any disclaimer, the term of this patent is extended or adjusted under 35 U.S.C. 154(b) by 167 days.

(21) Appl. No.: 09/788,069

(22) Filed: Feb. 16, 2001

(65) Prior Publication Data

US 2001/0044783 A1   Nov. 22, 2001

Related U.S. Application Data

(60) Provisional application No. 60/183,927, filed on Feb. 22, 2000, provisional application No. 60/182,935, filed on Feb. 16, 2000.

(51) Int. Cl.
*G06Q 99/00* (2006.01)

(52) U.S. Cl. .............................. 705/62; 705/50; 705/51

(58) Field of Classification Search .................. 705/62, 705/50, 51
See application file for complete search history.

(56) References Cited

U.S. PATENT DOCUMENTS

| | | | |
|---|---|---|---|
| 4,447,890 A | 5/1984 | Duwel et al. | |
| 4,725,718 A | 2/1988 | Sansone et al. | ............. 235/495 |
| 4,743,747 A | 5/1988 | Fougere et al. | ............. 235/494 |
| 4,757,537 A | 7/1988 | Edelmann et al. | ............. 380/51 |
| 4,775,246 A | 10/1988 | Edelmann et al. | ............. 380/23 |
| 4,802,218 A | 1/1989 | Wright et al. | |
| 4,812,994 A | 3/1989 | Taylor et al. | ........... 364/464.02 |
| 4,831,555 A | 5/1989 | Sansone et al. | ............. 364/519 |
| 4,837,702 A | 6/1989 | Obrea | |
| 4,853,865 A | 8/1989 | Sansone et al. | ........ 364/464.02 |
| 4,900,903 A | 2/1990 | Wright et al. | |
| 4,900,904 A | 2/1990 | Wright et al. | |
| 4,907,268 A | 3/1990 | Bosen et al. | |
| 4,908,770 A | 3/1990 | Breault et al. | |
| 4,933,849 A | 6/1990 | Connell et al. | |
| 4,935,961 A | 6/1990 | Gargiulo et al. | |
| 4,949,381 A | 8/1990 | Pastor | ......................... 380/51 |
| 4,980,542 A | 12/1990 | Jackson et al. | |

(Continued)

FOREIGN PATENT DOCUMENTS

EP    0 360 225 A2    3/1990

(Continued)

OTHER PUBLICATIONS

Ratcliffe, Mitch, "Ever feel you're being watched? You will."; *Digital Media*; May 16, 1994; v3, n12, 3pgs.

(Continued)

*Primary Examiner*—Pierre Eddy Elisca
(74) *Attorney, Agent, or Firm*—Christie, Parker & Hale, LLP.

(57) ABSTRACT

A method and apparatus for generating a Value Bearing Indicium (VBI) for on-line applications. A VBI is generated by hashing user information to create a message digest that is used to create a digital signature. The digital signature is combined with the user information to create a VBI that can be validated by a variety of stand-alone or on-line methods. An on-line postage metering application using the VBI is described.

38 Claims, 11 Drawing Sheets

U.S. PATENT DOCUMENTS

| | | |
|---|---|---|
| 5,048,085 A | 9/1991 | Abraham et al. |
| 5,058,008 A | 10/1991 | Schumacher |
| 5,060,263 A | 10/1991 | Bosen et al. |
| 5,075,865 A | 12/1991 | Kawamura et al. |
| 5,111,030 A | 5/1992 | Brasington et al. |
| 5,142,577 A | 8/1992 | Pastor ............... 380/21 |
| 5,181,245 A | 1/1993 | Jones |
| 5,241,483 A | 8/1993 | Porret et al. |
| 5,265,221 A | 11/1993 | Miller |
| 5,319,562 A | 6/1994 | Whitehouse |
| 5,325,519 A | 6/1994 | Long et al. |
| 5,341,505 A | 8/1994 | Whitehouse |
| 5,377,268 A | 12/1994 | Hunter |
| 5,379,391 A | 1/1995 | Belsan et al. |
| 5,384,886 A | 1/1995 | Rourke |
| 5,390,251 A | 2/1995 | Pastor et al. |
| 5,448,641 A | 9/1995 | Pintsov et al. ............ 380/51 |
| 5,454,038 A | 9/1995 | Cordery et al. |
| 5,471,925 A | 12/1995 | Heinrich et al. |
| 5,495,411 A | 2/1996 | Ananda |
| 5,548,645 A | 8/1996 | Ananda |
| 5,561,795 A | 10/1996 | Sarkar |
| 5,570,465 A | 10/1996 | Tsakanikas ............ 395/114 |
| 5,598,477 A | 1/1997 | Berson |
| 5,600,562 A | 2/1997 | Guenther |
| 5,621,797 A | 4/1997 | Rosen |
| 5,655,023 A | 8/1997 | Cordery et al. |
| 5,659,616 A | 8/1997 | Sudia |
| 5,666,421 A | 9/1997 | Pastor et al. ............ 380/51 |
| 5,668,897 A | 9/1997 | Stolfo |
| 5,671,146 A | 9/1997 | Windel et al. |
| 5,680,629 A | 10/1997 | Slayden et al. |
| 5,684,951 A | 11/1997 | Goldman et al. |
| 5,715,314 A | 2/1998 | Payne et al. |
| 5,729,734 A | 3/1998 | Parker et al. |
| 5,742,683 A | 4/1998 | Lee et al. |
| 5,768,132 A | 6/1998 | Cordery et al. |
| 5,781,438 A | 7/1998 | Lee et al. ............ 364/464.14 |
| 5,781,634 A | 7/1998 | Cordery et al. |
| 5,793,867 A | 8/1998 | Cordery et al. |
| 5,796,841 A | 8/1998 | Cordery et al. |
| 5,801,944 A | 9/1998 | Kara |
| 5,812,990 A | 9/1998 | Ryan, Jr. et al. |
| 5,812,991 A | 9/1998 | Kara |
| 5,815,577 A | 9/1998 | Clark |
| 5,819,240 A | 10/1998 | Kara |
| 5,822,739 A | 10/1998 | Kara |
| 5,825,893 A | 10/1998 | Kara ............ 380/51 |
| 5,867,578 A | 2/1999 | Brickell et al. |
| 5,871,288 A | 2/1999 | Ryan, Jr. et al. |
| 5,917,924 A | 6/1999 | Herbert |
| 5,918,234 A | 6/1999 | Shah et al. |
| 5,930,796 A | 7/1999 | Pierce et al. |
| 5,940,383 A | 8/1999 | Willkie |
| 5,953,427 A | 9/1999 | Cordery et al. ............ 380/51 |
| 5,956,404 A | 9/1999 | Schneier et al. |
| 5,960,411 A | 9/1999 | Hartman et al. |
| 5,978,484 A | 11/1999 | Apperson et al. |
| 5,983,227 A | 11/1999 | Nazem et al. |
| 5,987,441 A | 11/1999 | Lee et al. ............ 705/401 |
| 5,988,897 A | 11/1999 | Pierce et al. ............ 400/61 |
| 6,005,945 A | 12/1999 | Whitehouse ............ 380/51 |
| 6,009,417 A | 12/1999 | Brookner et al. |
| 6,010,156 A | 1/2000 | Block |
| 6,026,385 A | 2/2000 | Harvey et al. ............ 705/408 |
| 6,049,671 A | 4/2000 | Slivka et al. |
| 6,058,384 A | 5/2000 | Pierce et al. |
| 6,061,671 A | 5/2000 | Baker et al. |
| 6,064,993 A | 5/2000 | Ryan, Jr. ............ 705/403 |
| 6,065,117 A | 5/2000 | White |
| 6,070,150 A | 5/2000 | Remington et al. |
| 6,081,810 A | 6/2000 | Rosenzweig et al. |
| 6,098,058 A | 8/2000 | Gravell et al. |
| 6,105,063 A | 8/2000 | Hayes, Jr. |
| 6,134,582 A | 10/2000 | Kennedy |
| 6,151,591 A | 11/2000 | Pierce et al. |
| 6,161,139 A | 12/2000 | Win et al. |
| 6,164,528 A | 12/2000 | Hills et al. |
| 6,166,729 A | 12/2000 | Acosta et al. |
| 6,173,209 B1 | 1/2001 | Laval et al. |
| 6,173,274 B1 | 1/2001 | Ryan, Jr. |
| 6,192,349 B1 | 2/2001 | Husemann et al. |
| 6,223,166 B1 | 4/2001 | Kay |
| 6,226,752 B1 | 5/2001 | Gupta et al. |
| 6,233,565 B1 | 5/2001 | Lewis et al. |
| 6,233,568 B1 | 5/2001 | Kara |
| 6,249,777 B1 | 6/2001 | Kara et al. |
| 6,275,824 B1 | 8/2001 | O'Flaherty et al. |
| 6,286,098 B1 | 9/2001 | Wenig et al. |
| 6,324,523 B1 | 11/2001 | Killeen, Jr. et al. |
| 6,341,274 B1 | 1/2002 | Leon |
| 6,353,926 B1 | 3/2002 | Parthesarathy et al. |
| 6,367,013 B1 | 4/2002 | Bisbee et al. |
| 6,381,589 B1 | 4/2002 | Leon |
| 6,385,654 B1 | 5/2002 | Tanaka |
| 6,385,731 B2 | 5/2002 | Ananda |
| 6,408,286 B1 | 6/2002 | Heiden |
| 6,415,983 B1 | 7/2002 | Ulvr et al. |
| 6,424,954 B1* | 7/2002 | Leon ............ 705/401 |
| 6,427,021 B1 | 7/2002 | Fischer et al. |
| 6,434,238 B1 | 8/2002 | Chaum et al. |
| 6,446,204 B1* | 9/2002 | Pang et al. ............ 713/153 |
| 6,466,921 B1 | 10/2002 | Cordery et al. |
| 6,473,743 B1 | 10/2002 | Ryan, Jr. |
| 6,496,932 B1 | 12/2002 | Trieger |
| 6,505,773 B1 | 1/2003 | Palmer et al. |
| 6,546,377 B1 | 4/2003 | Gravell et al. |
| 6,567,794 B1 | 5/2003 | Cordery et al. |
| 6,587,880 B1 | 7/2003 | Saigo et al. |
| 6,636,983 B1 | 10/2003 | Levi |
| 6,957,196 B1 | 10/2005 | Cordery et al. |
| 6,972,859 B1 | 12/2005 | Patton et al. |
| 2001/0034716 A1 | 10/2001 | Goodwin |
| 2001/0037320 A1 | 11/2001 | Allport et al. |
| 2001/0055388 A1 | 12/2001 | Kaliski, Jr. |
| 2002/0023057 A1* | 2/2002 | Goodwin et al. ............ 705/50 |
| 2002/0046193 A1 | 4/2002 | Bator et al. |
| 2002/0095383 A1 | 7/2002 | Mengin et al. |
| 2002/0178354 A1* | 11/2002 | Ogg et al. ............ 713/155 |
| 2003/0078893 A1* | 4/2003 | Shah et al. ............ 705/60 |
| 2003/0130954 A1 | 7/2003 | Carr et al. |
| 2005/0114712 A1 | 5/2005 | Devine et al. |

FOREIGN PATENT DOCUMENTS

| | | |
|---|---|---|
| EP | 0 576 113 A2 | 12/1993 |
| EP | 0 604 146 A3 | 6/1994 |
| EP | 0 604 148 A3 | 6/1994 |
| EP | 0 647 925 A2 | 4/1995 |
| EP | 0 780 809 A2 | 6/1997 |
| EP | 0 604 146 B1 | 11/1997 |
| EP | 0 840 258 A2 | 5/1998 |
| EP | 0 854 448 A2 | 7/1998 |
| EP | 0 892 367 A2 | 1/1999 |
| EP | 0 927 957 A2 | 7/1999 |
| EP | 0 927 958 A2 | 7/1999 |
| EP | 0 927 963 A2 | 7/1999 |
| EP | 0 948 158 A2 | 10/1999 |
| GB | 2318486 A | 4/1998 |
| JP | 2001310538 | * 11/2001 |
| WO | WO 94/27258 A1 | 11/1994 |
| WO | WO 98/13790 A1 | 4/1998 |
| WO | WO 98/57302 | 12/1998 |
| WO | WO 98/57460 A1 | 12/1998 |

| | | |
|---|---|---|
| WO | WO 99/18514 A1 | 4/1999 |
| WO | WO 00/19382 A1 | 4/2000 |
| WO | WO 00/70503 A1 | 11/2000 |
| WO | WO 01/50227 A2 | 7/2001 |

OTHER PUBLICATIONS

U.S. Appl. No. 09/585,025, filed Jun. 1, 2000, "Online Value Bearing Item Printing", 125 pp.

U.S. Appl. No. 09/688,451, filed Oct. 16, 2000, Auditing Method and System for an On-Line Value-Bearing Item Printing System, 105pp.

U.S. Appl. No. 09/688,452, filed Oct. 16, 2000, "Role Assignments in a Cryptographic Module for Secure Processing of Value-Bearing Items", 105pp.

U.S. Appl. No. 09/688,456, filed Oct. 16, 2000, "Cryptographic Module for Secure Processing of Value-Bearing Items", 109pp.

U.S. Appl. No. 09/690,066, filed Oct. 16, 2000, "Cryptographic Module for Secure Processing of Value-Bearing Items", 121pp.

U.S. Appl. No. 09/690,083, filed Oct. 16, 2000, "Cryptographic Module for Secure Processing of Value-Bearing Items", 109pp.

U.S. Appl. No. 09/690,243, filed Oct. 17, 2000, "Method and Apparatus for On-Line Value-Bearing Item System", 66pp.

U.S. Appl. No. 09/690,796, filed Oct. 17, 2000, "Secure and Recoverable Database for On-Line Value-Bearing Item System", 71pp.

U.S. Appl. No. 09/692,746, filed Oct. 18, 2000, "Method and Apparatus for Digitally Signing an Advertisement Area Next to a Value-Bearing Item", 61pp.

U.S. Appl. No. 09/692,829, filed Oct. 18, 2000, "Postal System Intranet and Commerce Processing for On-Line Value-Bearing System", 179pp.

U.S. Appl. No. 10/083,236, filed Feb. 26, 2002, "Secured Centralized Public Key Infrastructure", 101pp.

Fickel, Louise, "Know Your Customer," 100 Leaders for the Next Millennium, CIO Magazine, Aug. 15, 1999, 10pp.

Sagner, James S., "Protecting Organizations from Electronic-Transaction Fraud", Healthcare Financial Management; Westchester; Feb. 1995; 2pp.

Pastor, Jose; CRYPTOPOST™—A Cryptographic Application to Mail Processing; Journal of Cryptology; 1991; 137-146pp.; vol. 3; No. 2; International Association for Cryptologic Research.

The United States Postal Service (USPS) Engineering Center; Information Based Indicia Program (IBIP) Indicium Specification; Jun. 13, 1996; 22pp.

The United States Postal Service (USPS); Information-Based Indicia Program (IBIP): Performance Criteria for Information-Based Indicia and Security Architecture for Closed IBI Postage Metering Systems (PCIBI-C); Jan. 12, 1999; 49pp.

Information-Based Indicia Program (IBIP); Performance Criteria for Information-Based Indicia and Security Architecture for Open IBI Postage Evidencing Systems (PCIBI-O); Jun. 25, 1999; 76pp.

Tygar, J.D. and Yee, Bennet; Cryptography: It's Not Just For *Electronic* Mail Anymore; School of Computer Science; Mar. 1, 1993; 1-21pp.; Carnegie Mellon University, Pittsburg, PA, USA.

Tygar, J.D. and Yee, Bennet; Dyad: A System for Using Physically Secure Coprocessors; School of Computer Science; May 4, 1991; 1-36pp.; Carnegie Mellon University, Pittsburg, PA, USA.

United States Postal Service, "Information Based Indicia Program Postal Security Device Specification" Jun. 13, 1996 (21 sheets).

\* cited by examiner

| DATA ELEMENTS | BARCODE DATA | HUMAN-READABLE DATA | (BYTES) | | FIELD NUMBER |
|---|---|---|---|---|---|
| INDICIA VERSION NUMBER | YES | NO | 1 | | 1 |
| ALGORITHM ID | YES | NO | 1 | | 2 |
| CERTIFICATE SERIAL NUMBER | YES | NO | 4 | | 3 |
| DEVICE ID | | | | | |
| –PSD MANUFACTURER ID | YES | YES | 2 | | 4 |
| –PSD MODEL D | YES | YES | 2 | | 5 |
| –PSD SERIAL NUMBER | YES | YES | 4 | | 6 |
| ASCENDING REGISTER | YES | NO | 5 | | 7 |
| POSTAGE | YES | YES | 3 | | 8 |
| DATE OF MAILING | YES | YES | 4 | | 9 |
| ORIGINATING ADDRESS: | | | | | |
| –CITY, STATE, ZIP CODE | YES | YES | | | --- |
| –LICENSING ZIP CODE | YES | NO | 4 | | 10 |
| DESTINATION DELIVERY POINT (0 VALUE) | YES | YES | 5 | | 11 |
| SOFTWARE ID | YES | NO | 6 | | 12 |
| DESCENDING REGISTER | YES | NO | 4 | | 13 |
| MAIL CLASS OR CATEGORY | | | | | |
| –RATE CATEGORY | YES | NO | 4 | | 14 |
| –ENDORSEMENT (MAIL CLASS) | NO | YES | | | --- |
| DIGITAL SIGNATURE | YES | NO | DSA 40 | RSA 128 | ECDSA 40 | 16 |
| RESERVE FIELD | YES | NO | VARIABLE SIZE | | 16 |

*FIG. 4*

| DATA ELEMENTS | BARCODE DATA | HUMAN-READABLE DATA | (BYTES) | FIELD NUMBER |
|---|---|---|---|---|
| INDICIA VERSION NUMBER | YES | NO | 1 | 1 |
| ALGORITHM ID | YES | NO | 1 | 2 |
| CERTIFICATE SERIAL NUMBER | YES | NO | 4 | 3 |
| DEVICE ID | | | | |
|   –PSD MANUFACTURER ID | YES | YES | 2 | 4 |
|   –PSD MODEL D | YES | YES | 2 | 5 |
|   –PSD SERIAL NUMBER | YES | YES | 4 | 6 |
| ASCENDING REGISTER | YES | NO | 5 | 7 |
| POSTAGE | YES | YES | 3 | 8 |
| DATE OF MAILING | YES | YES | 4 | 9 |
| ORIGINATING ADDRESS: | | | | |
|   –CITY, STATE, ZIP CODE | YES | YES | — | — |
|   –LICENSING ZIP CODE | YES | NO | 4 | 10 |
| DESTINATION DELIVERY POINT (0 VALUE) | YES | NO | 5 | 11 |
| SOFTWARE ID | YES | NO | 6 | 12 |
| DESCENDING REGISTER | YES | NO | 4 | 13 |
| MAIL CLASS OR CATEGORY | | | | |
|   –RATE CATEGORY | YES | NO | 4 | 14 |
|   –ENDORSEMENT (MAIL CLASS) | NO | YES | — | — |
| DIGITAL SIGNATURE | YES | NO | DSA 40 / RSA 128 / ECDSA 40 | 16 |
| DESTINATION DELIVERY POINT | YES | NO | 5 | 16 |
| RESERVE FIELD | YES | NO | VARIABLE SIZE | 17 |

FIG. 6

ON-LINE VALUE-BEARING INDICIUM PRINTING USING DSA

CROSS-REFERENCE TO RELATED APPLICATIONS

This application claims the benefit of U.S. Provisional Application No. 60/183,927 filed Feb. 22, 2000, and U.S. Provisional Application No. 60/182,935 filed Feb. 16, 2000, which are hereby incorporated by reference as if set forth in full herein.

The present application contains subject matter related to the subject matter in the following commonly assigned copending patent applications: U.S. patent application Ser. No. 09/585,025, filed Jun. 1, 2000 and entitled "ONLINE VALUE BEARING ITEM PRINTING", Ser. No. 09/688,451, filed Oct. 16, 2000 and entitled "AUDITING METHOD AND SYSTEM FOR AN ON-LINE VALUE-BEARING ITEM PRINTING SYSTEM", Ser. No. 09/690,456, filed Oct. 16, 2000 and entitled "CRYPTOGRAPHIC MODULE FOR SECURE PROCESSING OF VALUE BEARING ITEMS"; Ser. No. 09/690,066, filed Oct. 16, 2000 and entitled "CRYPTOGRAPHIC MODULE FOR SECURE PROCESSING OF VALUE-BEARING ITEMS"; Ser. No. 09/690,083, filed Oct. 16, 2000 and entitled "CRYPTOGRAPHIC MODULE FOR SECURE PROCESSING OF VALUE-BEARING ITEMS", Ser. No. 09/690,243, filed Oct. 17, 2000 and entitled "METHOD AND APPARATUS FOR ON-LINE VALUE-BEARING ITEM SYSTEM", Ser. No. 09/690,796, filed Oct. 17, 2000 and entitled "SECURE AND RECOVERABLE DATABASE FOR ON-LINE VALUE-BEARING ITEM SYSTEM", Ser. No. 09/692,746, filed Oct. 18, 2000 and entitled "METHOD AND APPARATUS FOR DIGITALLY SIGNING AN ADVERTISEMENT AREA NEXT TO A VALUE-BEARING ITEM", Ser. No. 09/692,829, filed Oct. 18, 2000 and entitled "POSTAL SYSTEM INTRANET AND COMMERCE PROCESSING FOR AN ON-LINE VALUE BEARING SYSTEM", Ser. No. 09/788,069 filed Feb. 16, 2001 and entitled "ON-LINE VALUE-BEARING INDICIUM PRINTING USING DSA", and Ser. No. 10/083,236 filed Feb. 26, 2002 and entitled "SECURED CENTRALIZED PUBLIC KEY INFRASTRUCTURE", and published U.S. Application Nos. 2001/0034716 A1, published on Oct. 25, 2001 entitled "SECURE ON-LINE TICKETING" and 2002/0023057 A1, published on Feb. 21, 2002 and entitled "WEB-ENABLED VALUE BEARING ITEM PRINTING".

FIELD OF THE INVENTION

The present invention relates to generating value-bearing indicia such as postage or ticket indicia. More specifically, the invention relates to an on-line system for validating and printing value-bearing indicia in a Wide Area Network (WAN) environment.

BACKGROUND OF THE INVENTION

Value-bearing indicia (VBI) are used in a variety of transactions where a holder of a VBI is entitled to receive goods or services. The holder of the VBI surrenders the VBI in exchange for receiving the goods or services. Typical examples of transactions using VBI are using postage stamps to mail packages, using a ticket to gain access to board an airplane, and using traveler's checks to pay for goods and services.

Transactions involving VBI comprise at least two steps, a user purchases a VBI from an issuing entity such as a postage vendor or airline and then the user redeems the VBI at the time the user wants to take delivery of an item from the issuing entity or use a service provided by the issuing entity. Purchasing the VBI may require a secure method allowing the user to purchase a valid VBI from the issuing entity.

An example of purchasing a VBI from an issuing entity is the purchase of metered postage from the a postage vendor. A significant percentage of the United States Postal Service (USPS) revenue is from metered postage. Metered postage is generated by utilizing postage meters that print special marks, also known as postal indicia, on mail pieces. Generally, printing postage can be carried out by using mechanical postage meters or computer-based systems.

With respect to computer-based postage processing systems, the USPS under the Information-Based Indicia Program (IBIP) has published specifications for IBIP postage meters that identify a special purpose hardware device, known as a Postal Security Device (PSD) that is generally located at a user's site. The PSD, in conjunction with the user's personal computer and printer, may function as the IBIP postage meter. The USPS has published a number of documents describing the PSD specifications, the indicia specifications and other related and relevant information.

A significant drawback of existing hardware-based systems is that a new PSD must be locally provided to each new user, which involves significant cost. Furthermore, if the additional PSD breaks down, service calls must be made to the user location. In light of the drawbacks in hardware-based postage metering systems, a software-based system has been developed that does not require specialized hardware for each user. The software-based system meets the IBIP specifications for a PSD, using a centralized server-based implementation of PSDs and includes a database for all users' information. The software-based system, however, has brought about new challenges.

The software-based system should be able to handle secure communications between users and the database. In a hardware-based system, security is generally handled by the local hardware piece, that is unique to each user and includes a cryptographic module that encrypts that user's information.

Another example of purchasing a VBI from an issuing entity is the purchase of a ticket to access a service such as an airline flight. Typically, a user buys a ticket directly from an airline or indirectly through a ticketing agency. The user specifies a flight and the airline or ticketing agency generates the ticket. The ticket generation process reserves a seat for the user and creates a ticket that is given to the user.

A significant drawback of existing ticketing systems is that the user may need to take physical possession of the ticket before it can be used. Physical receipt of the ticket usually requires that the airline or ticket agency mail the ticket to the user. Alternatively, the user may accept receipt of the ticket at a location prior to redeeming the ticket when boarding the specified flight.

Therefore, a software based on-line ticketing system is needed that is capable of issuing a ticket directly to the user so that the user can print the ticket for themselves. Furthermore, the issued ticket must be capable of being validated when the user redeems the ticket.

SUMMARY OF THE INVENTION

According to the present invention, Value Bearing Indicium (VBI) are generated for on-line applications using a digital signature algorithm. A VBI is generated by hashing user information to create a message digest that is used to create a digital signature. The digital signature is combined with the user information to create a VBI that can be validated by a variety of stand-alone or on-line methods.

In one aspect of the invention, a user provides information to an indicium generator server for generation of VBI. Relevant information is received from the user via the computer network. The relevant information is used to verify the identity of the user. A message digest is generated by hashing a first subset of the relevant information and a digital signature is generated from the message digest. A 2-D bar code is generated from a second subset of the relevant information and transmitted with the digital signature via the computer network to the user to be printed as a value bearing indicia.

In another aspect of the invention, a data processing system is adapted to provide postage for a mail piece to a user via a computer network. The data processing system receives a set of postage information from the user via the computer network. The data processing system verifies authenticity of the user based on the postage information. The data processing system generates a message digest by hashing a first subset of the postage information and generates a digital signature from the message digest. The data processing system generates a 2-D bar code from a second subset of the postage information and transmits via the computer network the digital signature and the 2-D bar code to the user to be printed next to each other as postage for the mail piece.

BRIEF DESCRIPTION OF THE DRAWINGS

These and other features, aspects, and advantages of the present invention will become better understood with regard to the following description, appended claims, and accompanying drawings where:

FIG. 4 is an exemplary table of relevant data;

FIG. 6 is a second exemplary table of relevant data;

DETAILED DESCRIPTION OF THE INVENTION

In one embodiment of the invention, an on-line value-bearing indicia printing system is based on a client/server architecture. Generally, in a system based on client/server architecture the server system delivers information to the client system. That is, the client system requests the services of a generally larger computer. In one embodiment, the client is a local personal computer and the server is a more powerful group of computers that house the information. The connection from the client to the server is made via a Local Area Network, a phone line or a TCP/IP based WAN on the Internet. Other forms of connections, such as wireless connection are possible. A primary reason to set up a client/server network is to allow many clients access to the same applications and files stored on the server system.

Figure 1:
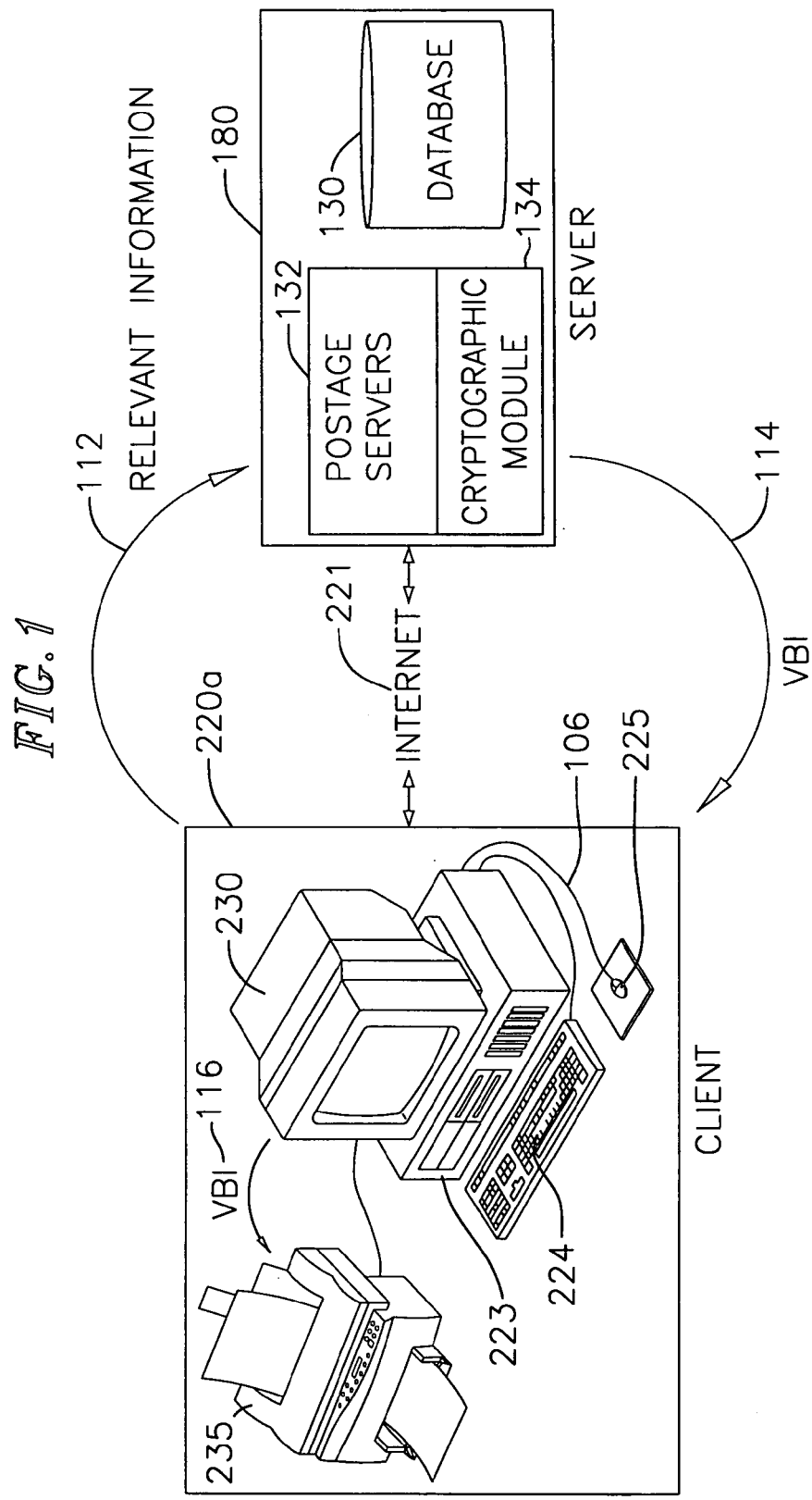
FIG. 1 is a schematic of an exemplary client/server system for generating value bearing indicia.

In one postage metering embodiment, the server system is remotely located in a separate location from the client. The server system is operably coupled to the client via the Internet. FIG. 1 illustrates a remote client system 220*a* connected to a server system 180 via the Internet 221. The client system includes a processor unit 223, a monitor 230, printer port 106, a mouse 225, a printer 235, and a keyboard 224. Server system 180 includes Postage servers 132, Database 130, and cryptographic modules 134.

In operation, a user uses the client system to transmit relevant information 112 to the server system. The server system generates a VBI 114 using a subset of the relevant information and transmits the VBI to the client system. The client system transmits the VBI 116 to the printer for printing. The user now has a hard copy of the VBI printed by the client system. The user takes the VBI and exchanges it for goods or services at another location.

A client software in association with a server software provides a graphical user interface (GUI) for interfacing with users and processing the information entered by the user. When a user activates a "print" button in a dialog box within the GUI, information such as the amount of the item or postage and other relevant data are transferred to the server. The PSD within a cryptographic device then generates a unique digital signature (discussed in more detail below) for the digital signature field of a postage indicium. Once all the other parameters required for the indicium are assembled, the indicium bitmap is generated and printed by the client software in accordance to the transmitted information.

Figure 2:
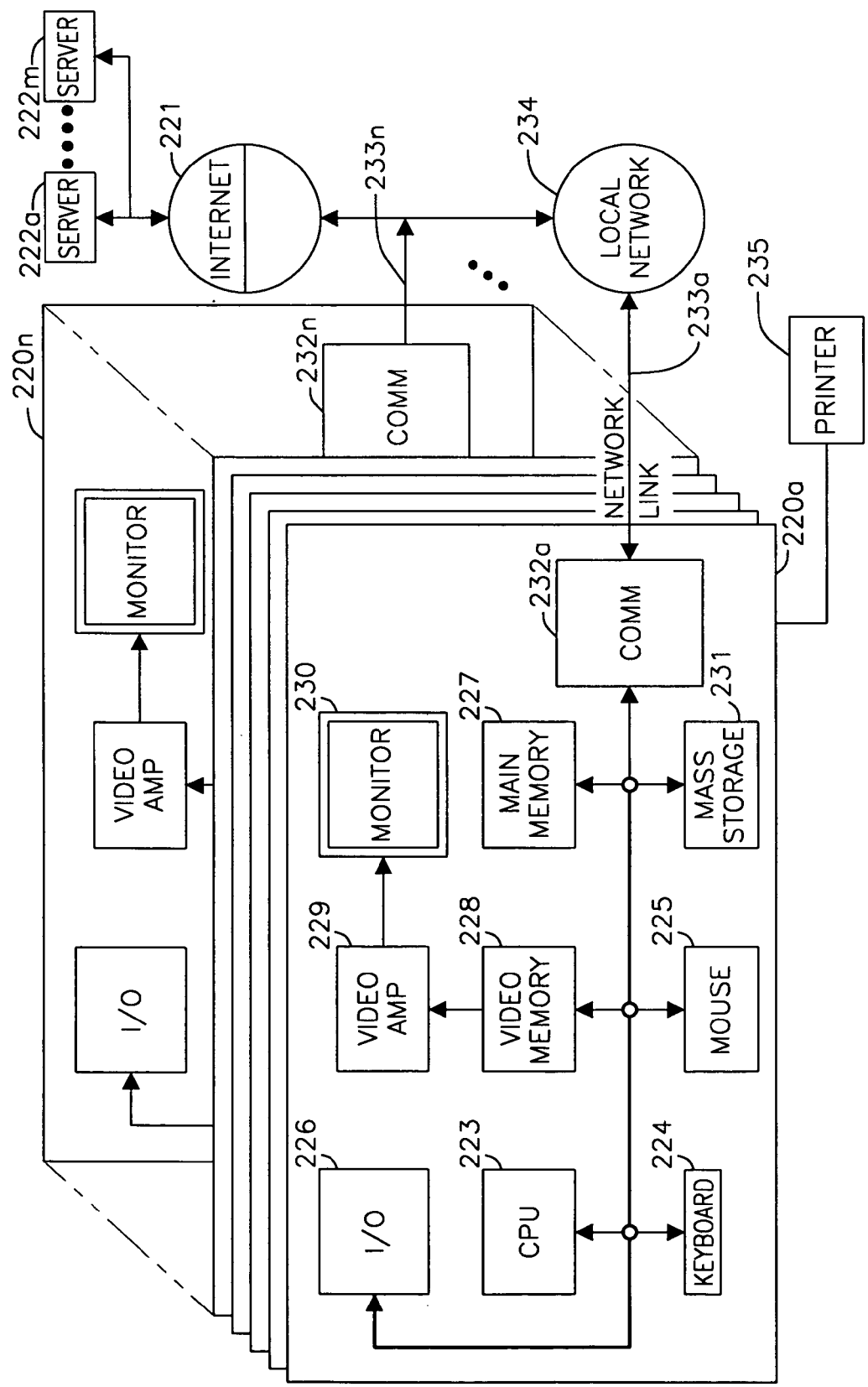
FIG. 2 is a schematic of an exemplary general purpose computer adapted for use in a client/server system for generating value bearing indicia.

FIG. 2 shows a simplified system block diagram of a typical Internet client/server environment used by an on-line postage system in one embodiment of the present invention. PCs 220*a*-220*n* used by the postage purchasers are connected to the Internet 221 through the communication links 233*a*-233*n*. Preferably, these communication links are secure. Each PC has access to one or more printers 235. Optionally, as is well understood in the art, a local network 234 may serve as the connection between some of the PCs, such as the PC 220*a* and the Internet 221 or other connections. Servers 222*a*-222*m* are also connected to the Internet 221 through respective communication links. Servers 222*a*-222*m* include information and databases accessible by PCs 220*a*-220*n*. The on-line postage system of the present invention resides on one or more of Servers 222*a*-222*m*.

In this embodiment, each client system 220a-220m includes a CPU 223, a keyboard 224, a mouse 225, a mass storage device 231, main computer memory 227, video memory 228, a communication interface 232a, and an input/output device 226 coupled and interacting via a communication bus. The data and images to be displayed on the monitor 230 are transferred first from the video memory 228 to the video amplifier 229 and then to the monitor 230. The communication interface 232a communicates with the servers 222a-222m via a network link 233a. The network link connects the client system to a local network 234. The local network 234 communicates with the Internet 221.

A client, preferably licensed by the USPS and registered with an IBIP vendor (such as Stamps.com), sends a request for authorization to print a desired amount of postage. The server system verifies that the client's account holds sufficient funds to cover the requested amount of postage, and if so, grants the request. The server system then sends authorization to the client system. The client system then sends image information for printing of a postal indicium for the granted amount to a printer so that the postal indicium is printed on an envelope or label.

Generation and verification of the indicium is carried out with a digital signature preferably using a Digital Signature Algorithm (DSA) as specified in the Digital Signature Standard (DSS) published as Federal Information Processing Standards Publication (FIPS PUB) 186 by the U.S. Department of Commerce/National Institute of Standards and Technology. The following steps describe the process of creation and verification of the indicium using a digital signature.

Figure 3:
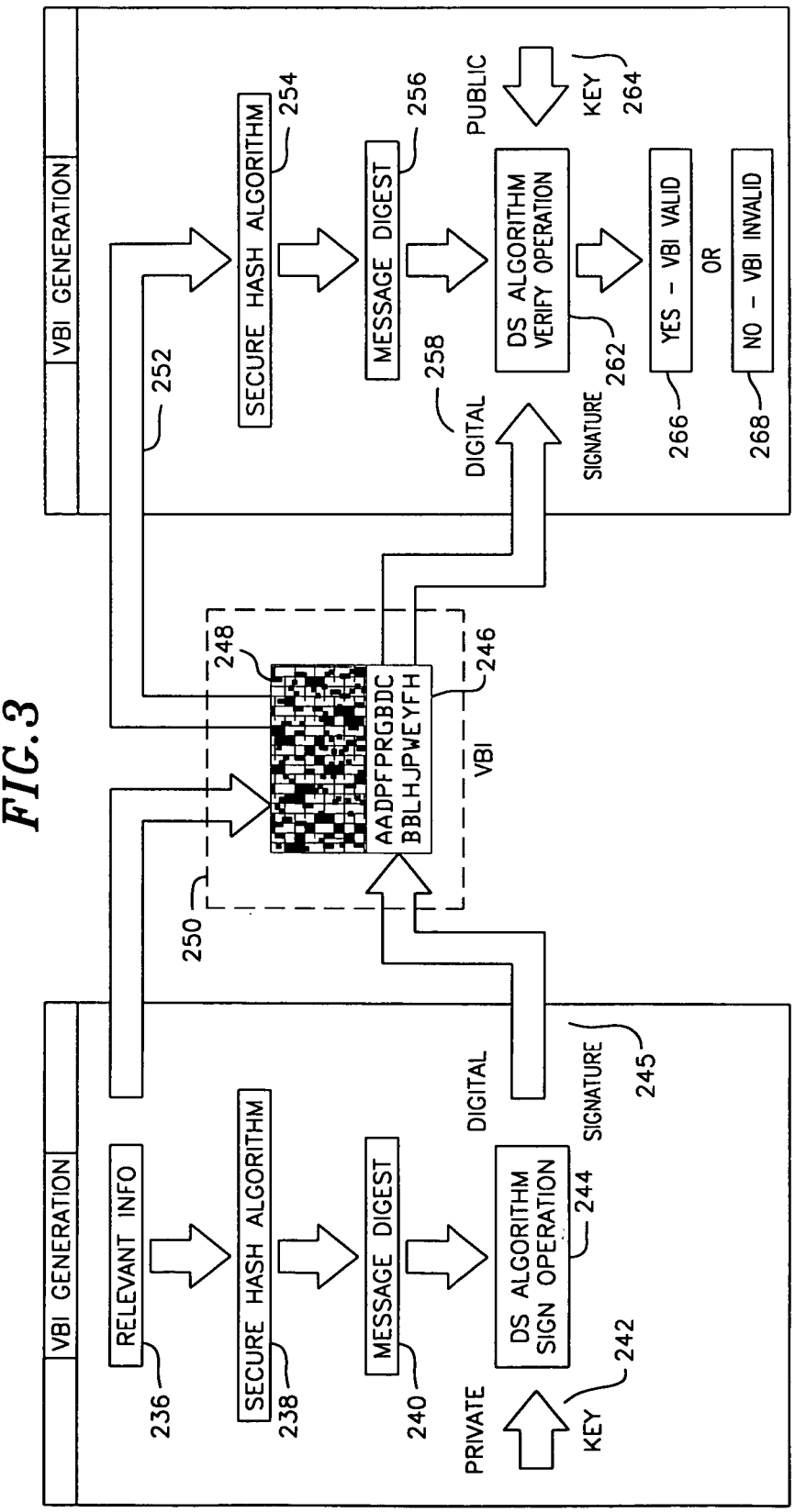
FIG. 3 is data process diagram of an exemplary process for generating a value bearing indicia using a digital signature algorithm.

FIG. 3 is a data flow diagram illustrating how a VBI is generated and verified using a digital signature. An indicium generator, such as the previously described postage metering server system, receives relevant information 236 from a user. A subset of the relevant information is processed using a secure hash algorithm 238 to produce a message digest 240. The message digest is combined with a private key 242 to generate 244 a digital signature 245.

The subset of the relevant information is used to generate a 2-D barcode 248 to be printed along with a textual representation 246 of the digital signature. The combination of the subset of relevant information encoded as the 2-D barcode and the textual representation of the digital signature create a VBI 250 that may be printed and redeemed for goods or services by the user.

Redemption of the VBI requires verification of the VBI. The subset of relevant information is read 253 from the VBI 2-D barcode and processed 254 using a secure hash algorithm and a message digest is created 256. The digital signature is read 258 from the VBI and combined with the message digest and a public key 264 using a digital signal verification process 262. The digital signature process produces a binary output. Either the VBI is valid 266 or the VBI is invalid 268.

The use of a 2-D barcode and a textual representation for printing the subset of relevant information used to create the VBI and the resultant digital signature respectively is an exemplary embodiment of a VBI. Other methods of combining the subset of relevant information and the digital signature may be used to create the VBI. For example, both the subset of relevant information and the digital signature may be printed using a 2-D barcode or both may be printed using a textual representation. Furthermore, other methods of encoding the subset of relevant information and the resultant digital signature may be employed besides the exemplary textual and 2-D barcode encoding.

In one embodiment, an indicium generator hashes user information to create a message digest and generates a digital signature using the message digest. The above described PSD is an exemplary indicium generator useful for generating postal indicia. The PSD takes relevant information, such as the exemplary relevant postal information in the relevant information table 216 of FIG. 4, including postage 202, descending register 204, ascending register 206, PSD serial number 208, date of mailing 210, and the like, and runs a one-way hashing algorithm on a subset of the relevant information.

Figure 5:
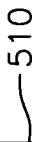
FIG. 5 is an exemplary hash table of data taken from the table of relevant data.

FIG. 5 depicts a hash table 510 comprising a subset of the relevant information as depicted in the relevant information table 216 of FIG. 4. Hashing the subset of relevant information yields a number, called a "message digest," based on the Secure Hash Algorithm (SHA-I), as specified in the Secure Hash Standard FIPS PUB 180. A one-way hashing algorithm is a one-way transformation that takes an input m and returns a fixed-size output string.

The PSD then uses the output of the hashing algorithm (first message digest) in conjunction with a private key to digitally sign a digital signature using DSA. It is generally impossible to retrieve the original message from the digitally signed message digest. DSA is a separate algorithm for digital signatures that cannot be used for encryption. Digital signatures are used to detect unauthorized modifications to data and to authenticate the identity of the signatory. A digital signature is represented in a computer as a string of binary digits. A digital signature is computed using a set of rules and a set of parameters such that the identity of the signatory and integrity of data can be verified. Signature generation makes use of a private key to generate a digital signature. Signature verification makes use of a public key which corresponds to, but is not the same as, the private key. Each user possesses a private key and public key pair. Private keys are never shared. Anyone can verify the signature of a user by employing that user's public key. The DSA authenticates the integrity of the signed data and the integrity of the signatory without encrypting the data, and without allowing the user to reconstruct the underlying data used to provide the digital signature. In this regard, the digital signature may be viewed as somewhat analogous to a human fingerprint that accurately identifies an individual but does not reveal the characteristics (e.g., height, weight, eye color) of the individual.

Referring again to FIG. 4, the PSD then places the digital signature in the "digital signature" field 200 of the relevant information table 216. Next, the client software takes in information in the relevant information table and places it in a barcode format according to different embodiments described below, and transfers the information to the user computer. The indicium including the digital signature and the information in the hash table 510 of FIG. 5 is then printed on a mail piece.

The verification of the digital signature is typically performed by the Postal service according to the following steps. The Postal Service scans the indicium printed on the mail piece including the digital signature with a barcode reader. The Post Office then reads the information in the table depicted in FIG. 3 printed as part of the non-digitally signed portion of the indicium from the mail piece and then Post Office runs an identical SHA-1 hashing algorithm on that information resulting in a second message digest.

The DSA verification process uses the second message digest, the scanned digital signature and the public key to verify the identity of the sender and that the data signed by the sender has not been changed. Note that there is no decryption involved in this process, and no comparison between decrypted information and human readable recipient address information appearing on the mail piece.

The process of signing a digital signature and verifying it is described in detail in FIPS PUB 186 entitled: "Digital Signature Standard" by U.S. Department of Commerce/ National Institute of Standards and Technology.

As shown in the relevant information table of FIG. 4, in one embodiment of the present invention, the Destination Delivery Point (DDP) field 212 has a "0" value and therefore practically eliminating the DDP field in the table. In another embodiment, the DDP field is not included in the hash table 510 of FIG. 5. Therefore, the DDP is not part of the secure hash algorithm inputs of the hash table for generating the message digest, which is later digitally signed.

In yet another embodiment, a "0" value is placed in the DDP field of the table of FIG. 4 and the DDP value is moved to the first five bytes of the Reserve Field 214. The resultant relevant information table 600 is shown in FIG. 6. In this embodiment, the hash table 510 of FIG. 5 is implemented without including the DDP value. This embodiment also prevents the DDP from being incorporated in the hash message digest. The above three embodiments of the present invention may be combined in one or more combination embodiments.

Figure 7A:
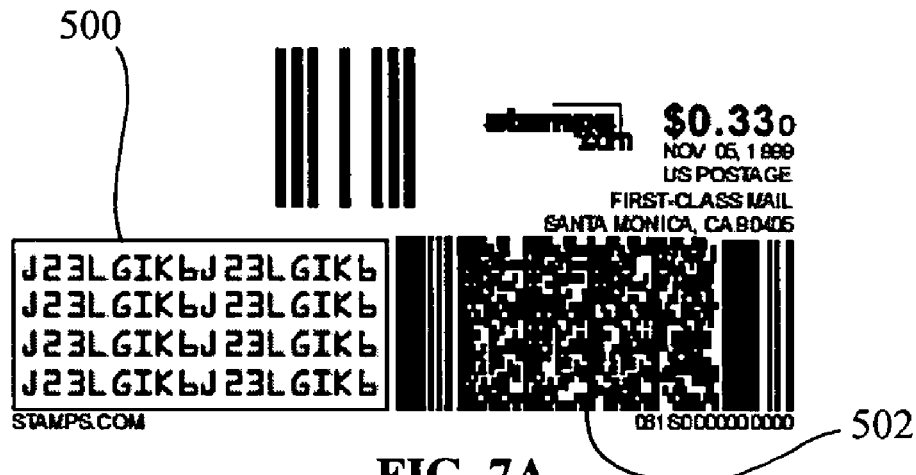
FIGS. 7A-7C are depictions of exemplary value bearing indicia.

In one embodiment, the digital signature 500 is created in plain text with an OCR-A (size I) standard and is placed to the left of the 2D barcode 502, as shown in FIG. 7A. In this embodiment, existing USPS scanning equipment can be used. The OCR-A standard has been adopted for Federal Government use, and it has been processed and approved for submittal to ANSI by the American National Standards Committee on Information Processing, X3. This standard provides the description, scope, and identification for a set of graphic shapes to be used in the application of optical character recognition (OCR) systems. This style is designated OCR-A and is comprised of 96 printing characters plus the Character Space, and includes digits, letters, small letters, and special symbols. OCR-A was designed to provide maximum machine efficiency under a wide range of applications. Three sizes of graphic shapes are provided—I, III, and IV (II is reserved for certain international applications). In addition to graphic shapes and related information, the standard provides basic requirements related to character positioning and the ASCII code table.

Figure 7B:
Figure 7C:
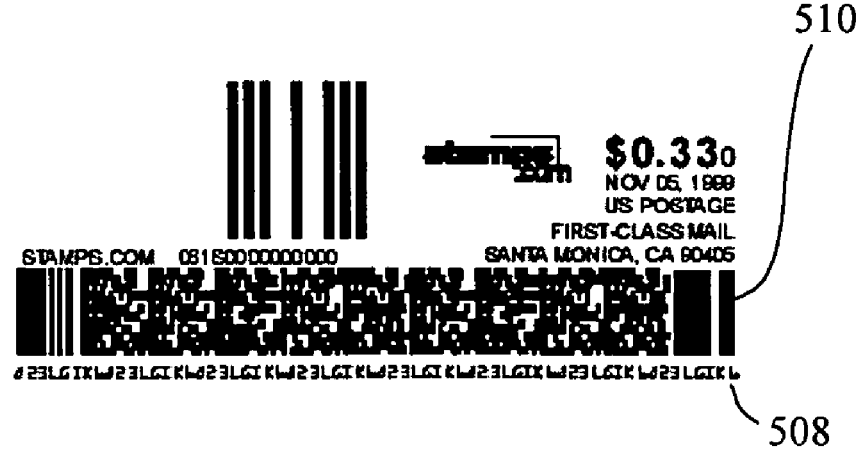

In another embodiment of the present invention, the digital signature 504 is created in plain text with an OCR-A (size I) standard and is placed below the 2D barcode 506, as shown in FIG. 7B. In this embodiment, existing USPS scanning equipment can be used. In yet another embodiment of the present invention, the digital signature 508 is created in plain text with a smaller size OCR-A standard and is placed below the 2D barcode 510, as shown in FIG. 7C.

The above described VBI generation and verification process is useful in a variety of applications. For example, the VBI generation and verification process can be used in on-line systems to issue postage, tickets, currency, vouchers, coupons and traveler's checks. An exemplary on-line postage system is described in U.S. patent application Ser. No. 09/163,993 filed Sep. 29, 1998, the contents of which are hereby incorporated by reference. The on-line postage system includes an authentication protocol that operates in conjunction with the USPS. The system utilizes on-line postage system software comprising user code that resides on a client system and controller code that resides on a server system. The on-line postage system allows a client to print a postal indicium at home, at the office, or any other desired place in a secure, convenient, inexpensive and fraud-free manner. The system comprises a user system electronically connected to a server system, which in turn is connected to a USPS system.

In one embodiment, the server system is remotely located in a separate location from the client. All communications between the client and the server are preferably accomplished via the Internet. Referring again to FIG. 1, a remote client system 220a connected to a server system 180 via the Internet 221. The client system includes a processor unit 223, a monitor 230, printer port 106, a mouse 225, a printer 235, and a keyboard 224. Server system 180 includes Postage servers 132, Database 130, and cryptographic modules 134.

The Server system 180 is designed in such a way that all of the business transactions are processed in the servers and not in the database. By locating the transaction processing in the servers, increases in the number of transactions can be easily handled by adding additional servers. Also, each transaction processed in the servers is stateless, meaning the application does not remember the specific hardware device the last transaction utilized. Because of this stateless transaction design, multiple machines can be added to each subsystem in order to handle increased loads. In one embodiment, load balancing hardware and software techniques are used to distribute traffic among the multiple servers.

Furthermore, each cryptographic module is a stateless device, meaning that a PSD package can be passed to any device because the application does not rely upon any information about what occurred with the previous PSD package. A PSD package for each cryptographic module includes all data needed to restore the PSD to its last known state when it is next loaded into a cryptographic module. This includes the items that the IBIP specifications require to be stored inside the PSD, information required to return the PSD to a valid state when the record is reloaded from the database, and data needed for record security and administrative purposes.

In one embodiment, the items included in a PSD package include ascending and descending registers, device ID, indicium key certificate serial number, licensing ZIP code, key token for the indicium signing key, the user secrets, key for encrypting user secrets, data and time of last transaction, the last challenge received from the client, the operational state of the PSD, expiration dates for keys, the passphrase repetition list and the like.

As a result, the need for specific PSDs being attached to specific cryptographic modules is eliminated. A Postal Server subsystem provides cryptographic module management services that allow multiple cryptographic modules to exist and function on one server, so additional cryptographic modules can easily be installed on a server. This Postal Sever subsystem is easy to scale by adding more cryptographic modules and using commonly known Internet load-balancing techniques to route inbound requests to the new cryptographic modules.

Postage servers 132 provide indicium creation, account maintenance, and revenue protection functionality for the on-line postage system. The Postage servers 132 include several physical servers in several distinct logical groupings, or services as described below. The individual servers could be located within one facility, or in several facilities, physically separated by great distance but connected by secure communication links.

Cryptographic modules 134 are responsible for creating PSD packages and manipulating PSD package data to protect sensitive information from disclosure, generating the cryptographic components of the digital indicium, and securely adjusting the user registers. When a user wishes to print postage or purchase additional postage value, a user state is instantiated in the PSD implemented within one of the cryptographic modules 134. Database 130 includes all the data accessible on-line for indicium creation, account maintenance, and revenue protection processes. Postage servers 132, Database 130, and cryptographic modules 134 are maintained in a physically secured environment, such as a vault.

Figure 8:
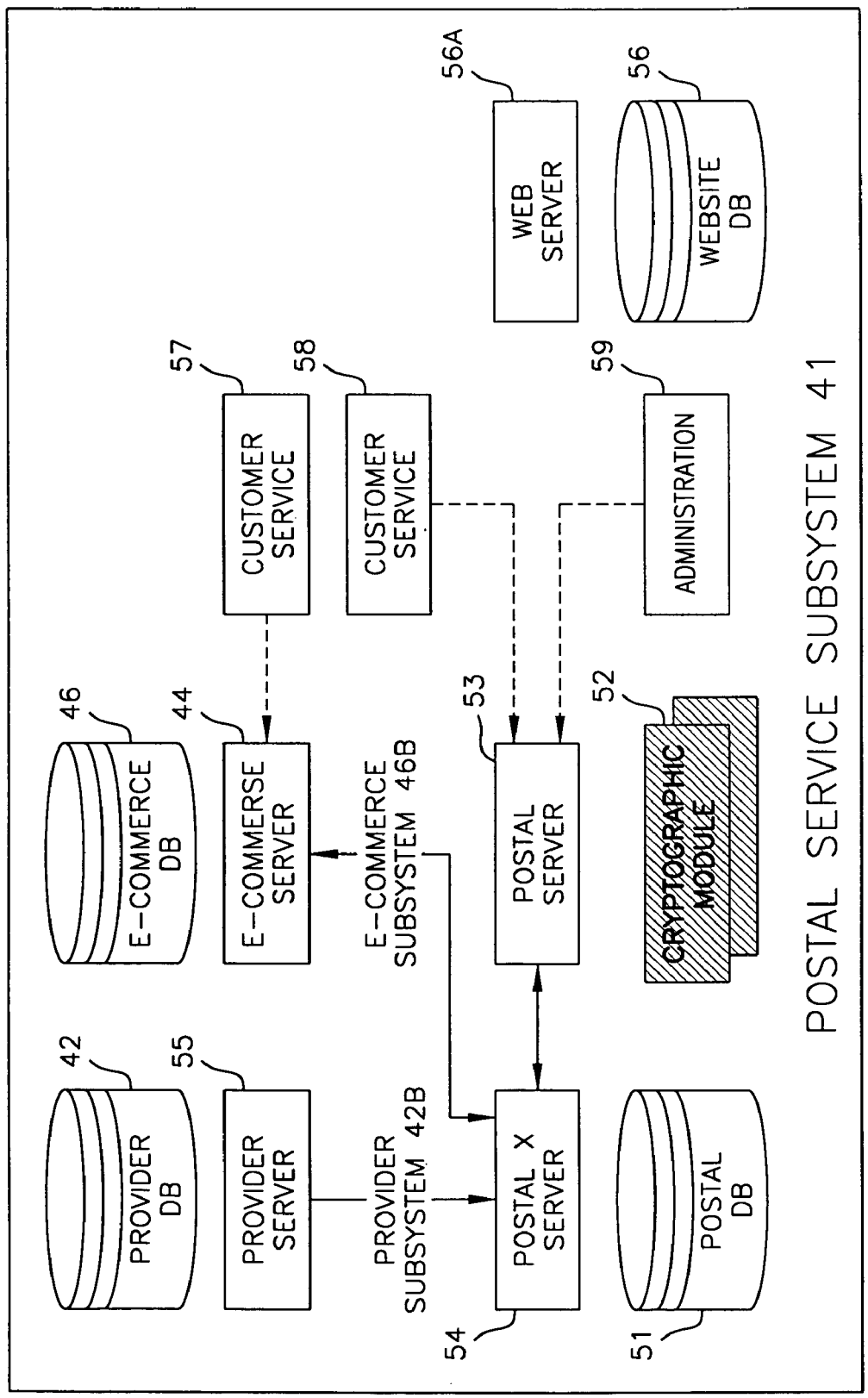
FIG. 8 is a software architecture diagram of an exemplary postage system employing a value bearing indicium.

In one embodiment, as illustrated in FIG. 8, the Postal Server subsystem 41 is physically comprised of at least one cryptographic module 52, at least one Postal Server 53 and at least one PostalX Server (PSX) 54. When the workload is increased, the number of each of these devices can be increased to accommodate the additional work.

In one embodiment of the present invention, the cryptographic modules 52 are FIPS 140-1 certified hardware cards or other hardware that include firmware to implement PSD functionality in a cryptographically secure way. The cryptographic modules are inserted into any of the servers in the Postal Server Infrastructure. The cryptographic modules are responsible for creating PSDs and manipulating PSD data to generate and verify digitally signed indicia. Since the PSD data is created and signed by a private key known only to the card, the PSD data may be stored externally to the cryptographic modules without compromising security.

In one embodiment of the present invention, Postal Server 53 is a standalone server process that provides secure connections to both the clients and the server administration utilities, providing both client authentication and connection management functionality to the system. Postal Server 53 also houses postal-specific services that require high levels of security, such as purchasing postage or printing indicia. Postal Server 53 is comprised of at least one server, and the number of servers increases when more clients need to be authenticated, are purchasing postage or are printing postage indicia.

In one embodiment of the present invention, PXS 54 is a standalone server process that provides trusted plain-text access to in-vault components. PXS 54 hosts postal-specific services that are protected from access external to the vault via a firewall. The PostalX Services provide business logic for postal functions such as device authorization and postage purchase/register manipulation. The PXS services require cryptographic modules to perform all functions because the PXS services are vital to the system's integrity and are protected by encryption. The PXS services can be located on one physical server or multiple machines depending on the number of postal-specific transactions.

When a client system sends a postage print request to the server system, the request must be authenticated before the client system is allowed to print the postage, and while the postage is being printed. The client system sends a password (or passphrase) entered by a user to the server system for verification. If the password fails, a preferably asynchronous dynamic password verification method terminates the session and printing of postage is aborted. Also, the server system communicates with a system located at the USPS for verification and authentication purposes. The information processing components of the on-line postage system include a client system, a postage server system located in a highly secure facility, a USPS system and the Internet as the communication medium among those systems. The information processing equipment communicates over a secured communication line.

The on-line postage system does not require any special purpose hardware for the client or user system. The client system is implemented in the form of software that can be executed on a user computer (client system) allowing the user computer to function as a virtual postage meter. The software can only be executed for the purpose of printing the postage indicium when the user computer is in communication with a server computer located, for example, at a postage meter vendor's facility (server system). The server system is capable of communicating with one or more client systems simultaneously.

The above described VBI generation and verification process can be used in on-line systems to issue tickets. In one embodiment, an indicium generator is used to provide tickets for air travel. Functionally, the system may be broken down into two parts, itinerary generation and Passenger Validation Information (PVI).

The exemplary ticketing system includes the purchase and printout of a ticket, such as an airline itinerary with an associated indicium that contains PVI used for boarding purposes. An airline ticket is used as an example throughout this example, however, it is understood that the ticketing system of the present invention is not limited to printing airline tickets. The ticketing system is capable of printing all types of tickets and value-bearing items such as, tickets for entertainment events, coupons, checks, gift certificates, and the like.

In the exemplary case of airline tickets, PVI includes fields such as ticket number, passenger name, seat number, flight number, etc. The user experience happens in the context of a standard web browser. A web site is provided that allows a user to purchase an airline ticket. After purchasing the ticket, the user is presented with an itinerary with an image of an indicium that contains the PVI associated with that ticket. The user is able to print out the web page using the standard print functionality provided by the browser.

The second part of the system includes the user interaction at the boarding gate. A standalone boarding application that interfaces with a scanner, for example, a Metanetics IR2000 scanner is presented. The printed page is scanned using the scanner, and the application displays the relevant PVI embedded in the indicium. Additionally, on a first time scan of the indicium, the application indicates that the passenger is cleared for boarding. Subsequent scans of the same indicium shows that the boarding pass has already been used. A scan of an indicium NOT generated by the system presents a "not valid indicium" message to the user indicating that the scanned indicium is not in the inventory database.

The following section describes the design and data flow to implement the functional requirements of one embodiment the system. This design eliminates the need for the system to host an application to generate indicia directly onto the web server data store. This minimizes coding and deployment efforts.

Figure 9:
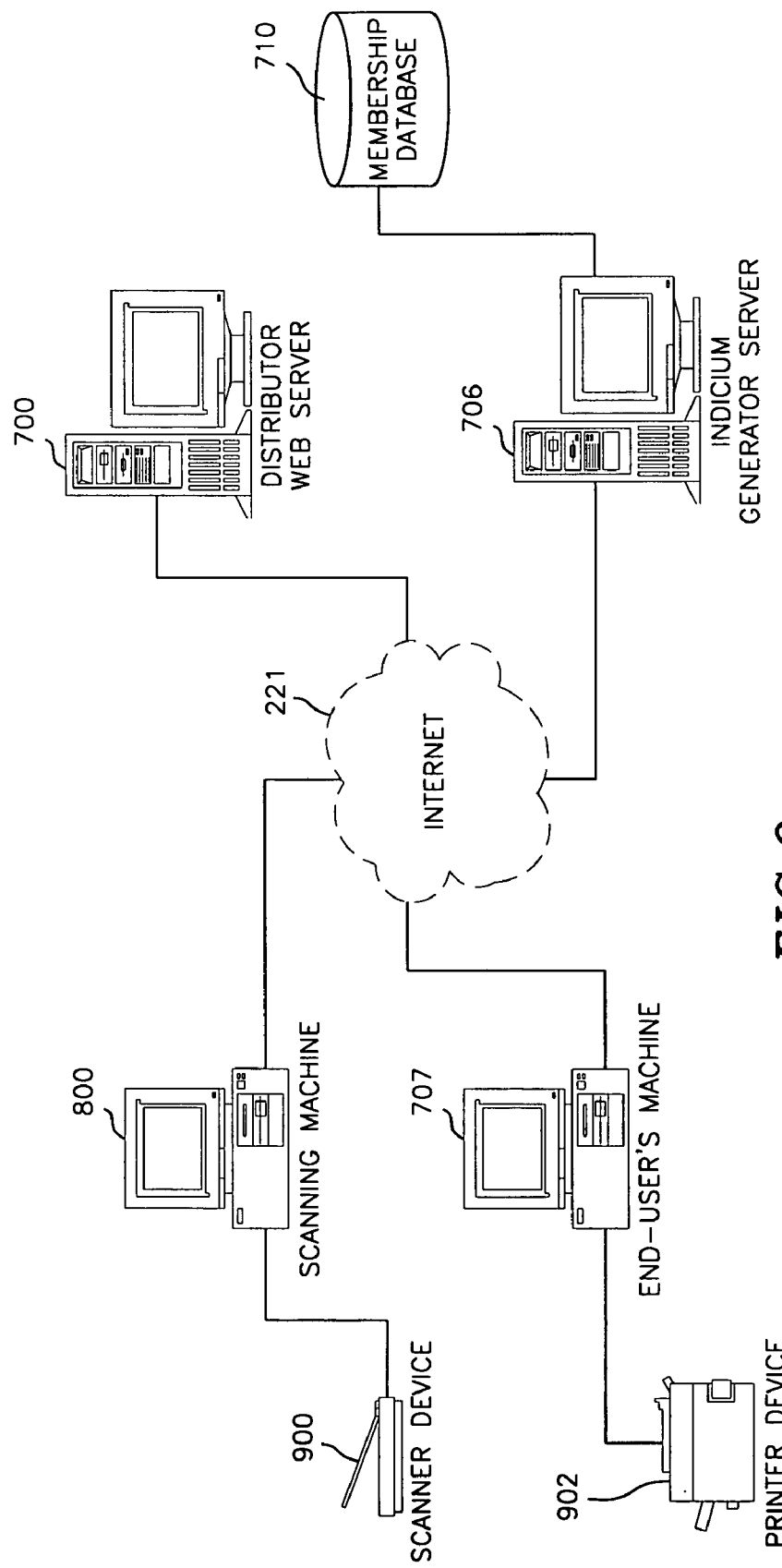
FIG. 9 is a deployment diagram of an exemplary ticketing system employing a value bearing indicium according to the present invention.

FIG. 9 is deployment diagram of an exemplary ticketing system according to one embodiment of the present invention. An indicium generator 706 is operably coupled to a membership database 710. The indicium generator server generates indicia and stores them in the membership database for tracking during a redemption process.

The indicium generator is operably coupled via the Internet 221 to a distributor Web server 700. The distributor Web server provides a user interface in the form of a Web site for the purchase of tickets. The distributor Web server also supplies the business rules controlling the purchase of tickets by a user. A Web browser running on an end-user's machine 707 is operably coupled to the distributor Web server via the Internet. A user uses the Web site hosted by the distributor Web server to purchase a ticket that is printed on a printer device 902.

A scanning machine 800 is operably coupled to a scanning device 900 for scanning tickets and operably coupled to the indicium generator server via the Internet. The scanning machine scans the ticket and contacts the indicium generator server to determine that the scanned ticket is valid.

Figure 10:
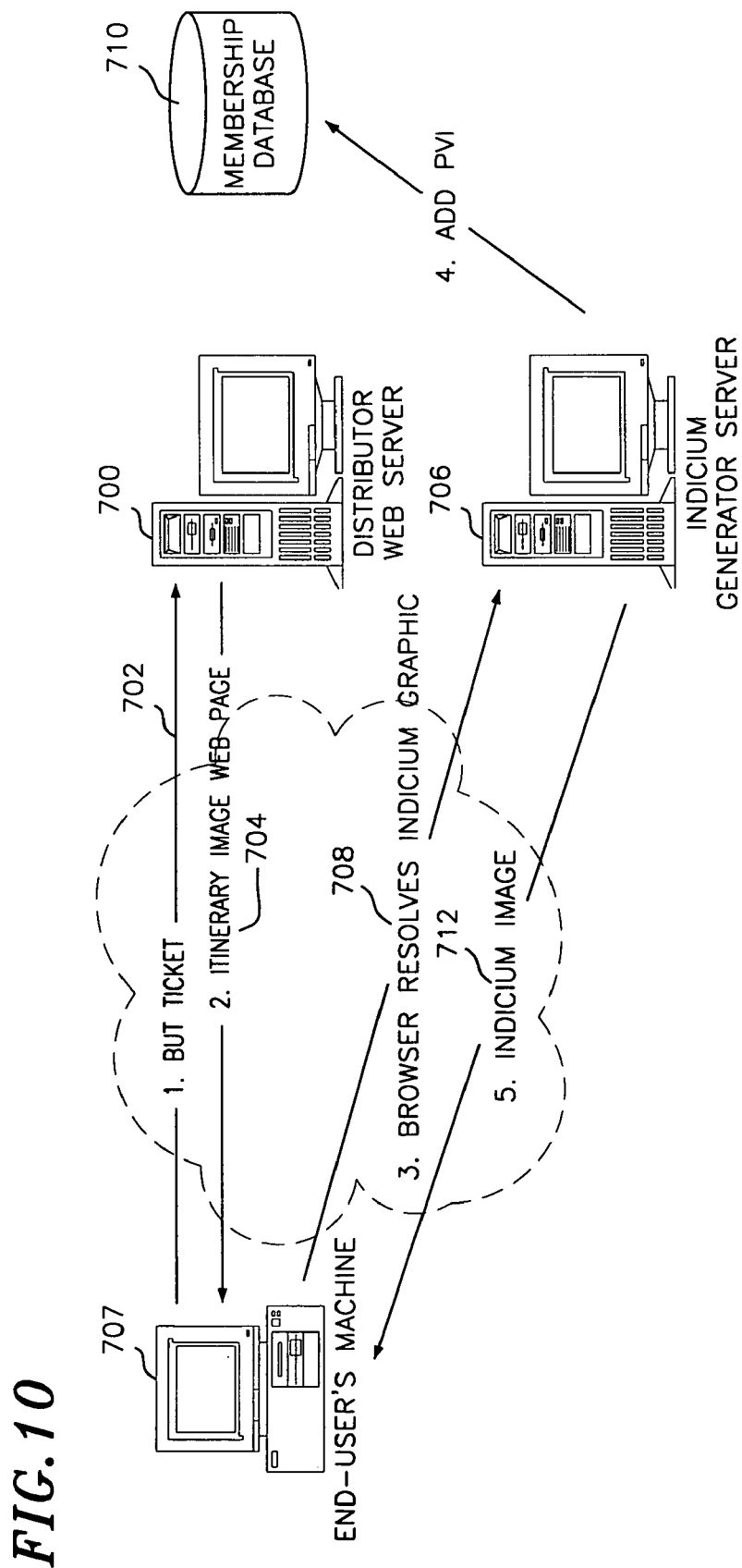
FIG. 10 is a collaboration diagram depicting an exemplary ticket buying process using an exemplary ticketing system employing a value bearing indicium according to the present invention.

FIG. 10 is a diagram illustrating the data flow between a ticket distributor web server and an indicium generator system to implement itinerary generation function.

A web server 700 hosts a web site that allows a user to navigate and purchase 702 a ticket. The web server is responsible for the Look and Feel (L&F) of the web site.

The web server, after application processing logic relevant to ticket reservation and generation, may generate a web page 704 with itinerary information, marketing data, and link to the indicium graphic. The link references an indicium generator web server 706 with sufficient parameters (PVI plus any other relevant reference data) in order to later generate the associated indicium image.

A browser hosted by end user machine 707 then displays the resultant page, resolving 708 the indicium link with the indicium generator server.

Upon receiving the request for the indicium image, the indicium generator web server enters the associated PVI data and other relevant data into the Indicium generator database 710 for later reference. After storing the data, the server generates the indicium image based on the PVI data.

The indicium image is returned 712 back to the browser for display within the itinerary page. At this point the user may print the page.

Figure 11:
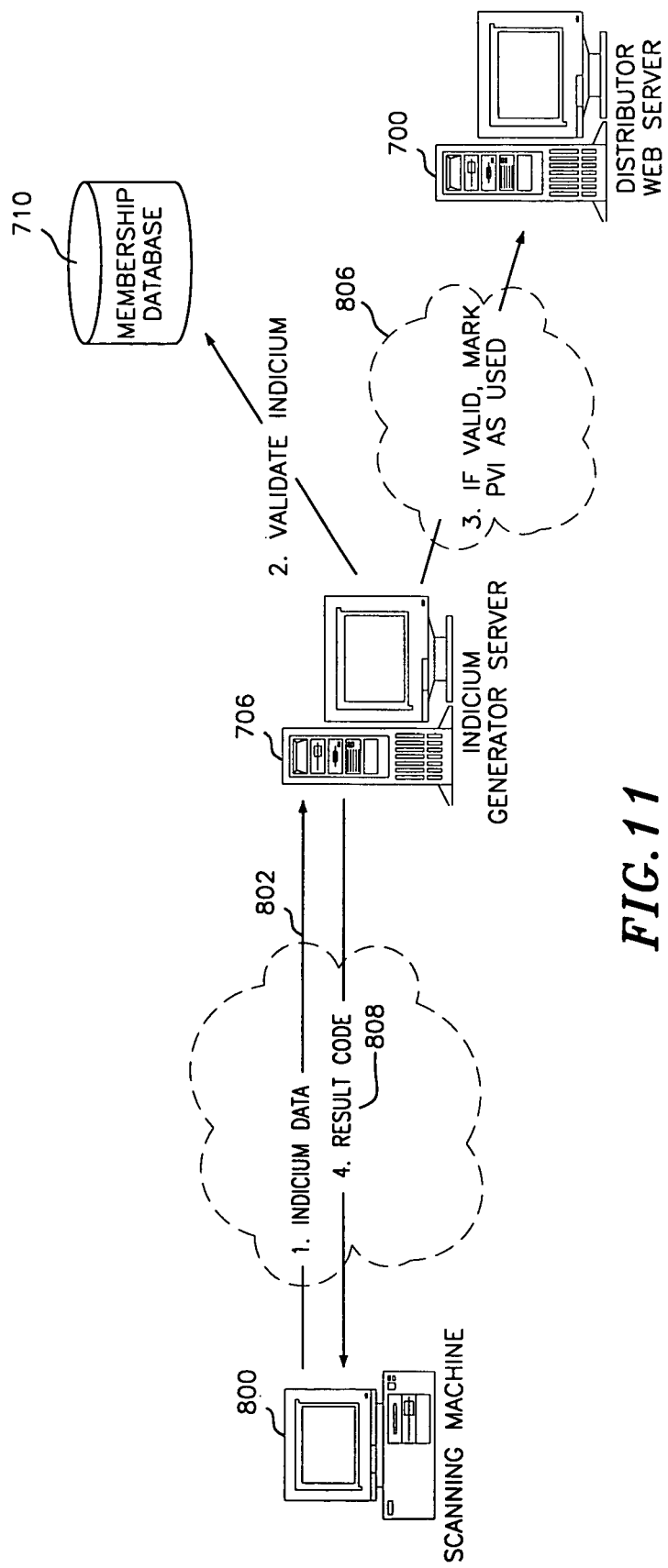
FIG. 11 is a collaboration diagram depicting an exemplary ticket redeemption process using an exemplary ticketing system employing a value bearing indicium according to the present invention.

FIG. 11 is a diagram illustrating the data flow between the ticket distributor and indicium generator systems to implement PVI validation function.

A scanning computer 800 hosts an application that interfaces with a scanner, such as a Metanetics IR2000 scanner. The application is responsible for providing a user interface to display the PVI data. Upon scanning the indicium, the PVI data from the indicium is extracted, and forwarded 802 to an indicium generator server 706 for processing.

Upon receiving the request, the indicium generator server application logic validates 804 the indicium data for referential integrity and existence within an indicium generator database 710. If the indicium has not already been used, it is marked as used.

If the PVI is being used for the first time, the indicium generator server sends a command 806 to the ticket distributor server to indicate the associated passenger has boarded the plane.

The indicium generator server returns a result 808 back to the scanning application indicating one of three possible events: valid PVI, PVI already used; or invalid PVI data. The scan utility displays the contents of the indicium and the server result.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention.

What is claimed is:

1. A method of printing a value bearing indicium (VBI), the method comprising the steps of:
   generating a message digest by hashing relevant information;
   generating a textual representation of a digital signature from the message digest;
   generating a 2-D bar code comprising the relevant information;
   generating the indicium, wherein the indicium includes the textual representation of the digital signature and the 2-D bar code; and
   communicating the indicium from one of a plurality of stateless cryptomodules to one of a plurality of remotely located user computers, each stateless cryptomodule being programmable to service any of the plurality of remotely located user computers.

2. The method of claim 1, wherein the VBI is a ticket.

3. The method of claim 1, wherein the VBI is a coupon.

4. The method of claim 1, wherein the VBI is a traveler's check.

5. The method of claim 1, wherein the VBI is currency.

6. The method of claim 1, wherein:
   the representation of the digital signature further includes a right side;
   the 2-D bar code further includes a left side; and
   the representation of the digital signature right side is adjacent to the 2-D bar code left side.

7. The method of claim 1, wherein:
   the representation of the digital signature further includes a top side;
   the bar code further includes a bottom side; and
   the representation of the digital signature top side is adjacent to the 2-D bar code bottom side.

8. The method of claim 1, wherein:
   the representation of the digital signature further includes a bottom side;
   the bar code further includes a top side; and
   the representation of the digital signature bottom side is adjacent to the 2-D bar code top side.

9. The method of claim 1, wherein:
   the representation of the digital signature further includes a right side;
   the bar code further includes a left side; and
   the representation of the digital signature right side is adjacent to the 2-D bar code left side.

10. The method of claim 1, wherein the VBI is postage for a mail piece.

11. The method of claim 10, wherein the relevant information include one or more of an indicium version number, an algorithm identifier, a certificate serial number, a postage security device manufacturer identifier, a postage security device model identifier, a postage security device serial number, an ascending register value, a postage amount, a date of mailing, a licensing postal code, a software identifier, a descending register value, and a rate category.

12. The method of claim 1, wherein each stateless cryptomodule being programmable to service any of the plurality of remotely located user computers includes accessing user data from a database.

13. A data processing system adapted to print a value bearing indicium (VBI), the data processing system comprising:
   one or more processors, at least one of which is associated with a stateless cryptomodule and another of which is associated with a user computer located remotely from the stateless cryptomodule, the stateless cryptomodule being one of a plurality of stateless cryptomodules, each stateless cryptomodule programmable to service any remotely located user computer; and one or more memories operably coupled to the processors and having program instructions stored therein, the processors being operable to execute the program instructions, the program instructions including:

generating a message digest by hashing relevant information;

generating a text representation of a digital signature;

generating a 2-D bar code comprising the relevant information; and generating the indicium, wherein the indicium includes the textual representation of the digital signature and the 2-D bar code.

14. The data processing system of claim 13, wherein:
the representation of the digital signature further includes a right side;
the 2-D bar code further includes a left side; and
the representation of the digital signature right side is adjacent to the 2-D bar code left side.

15. The data processing system of claim 13, wherein:
the representation of the digital signature further includes a top side;
the bar code further includes a bottom side; and
the representation of the digital signature top side is adjacent to the 2-D bar code bottom side.

16. The data processing system of claim 13, wherein:
the representation of the digital signature further includes a bottom side;
the bar code further includes a top side; and
the representation of the digital signature bottom side is adjacent to the 2-D bar code top side.

17. The data processing system of claim 13, wherein:
the representation of the digital signature further includes a left side;
the 2-D bar code further includes a left right; and
the representation of the digital signature left side is adjacent to the 2-D bar code right side.

18. The data processing system of claim 13 wherein the data processing system is a closed metering system.

19. The data processing system of claim 13 wherein the data processing system is an open metering system.

20. The data processing system of claim 13, wherein each stateless cryptomodule being programmable to service any of the plurality of remotely located user computers includes accessing user data from a database.

21. A data processing system comprising:
a plurality of stateless cryptomodules and a plurality of remote user computers in communication with at least one of the plurality of stateless cryptomodules, each stateless cryptomodule being programmable to service any of the plurality of remote user computers, wherein the data processing system is adapted to print a VBI;
a processor; and
a memory operably coupled to the processor and having program instructions stored therein, the processor being operable to execute the program instructions, the program instructions including:
generating a message digest by hashing relevant information;
generating a text representation of a digital signature;
generating a 2-D bar code comprising the relevant information; and
generating the indicium, wherein the indicium includes the textual representation of the digital signature and the 2-D bar code.

22. The data processing system of claim 21, wherein:
the representation of the digital signature further includes a right side; the 2-D bar code further includes a left side; and
the representation of the digital signature right side is adjacent to the 2-D bar code left side.

23. The data processing system of claim 21, wherein:
the representation of the digital signature further includes a top side;
the 2-D bar code further includes a bottom side; and
the representation of the digital signature top side is adjacent to the 2-D bar code bottom side.

24. The data processing system of claim 21, wherein:
the representation of the digital signature further includes a left side;
the 2-D bar code further includes a right side; and
the representation of the digital signature left side is adjacent to the 2-D bar code right side.

25. The data processing system of claim 21, wherein:
the representation of the digital signature further includes a bottom side;
the 2-D bar code further includes a top side; and
the representation of the digital signature bottom side is adjacent to the 2-D bar code top side.

26. The data processing system of claim 21, wherein the VBI is postage for a mail piece.

27. The data processing system of claim 21, wherein the VBI is a ticket.

28. The data processing system of claim 21, wherein the VBI is a coupon.

29. The data processing system of claim 21, wherein the VBI is a traveler's check.

30. The data processing system of claim 21, wherein the VBI is currency.

31. The data processing system of claim 21, wherein the VBI is postage for a mail piece.

32. The data processing system of claim 21, wherein each stateless cryptomodule being programmable to service any of the plurality of remote user computers includes accessing user data from a database.

33. A computer-readable storage medium embodying computer program instructions for execution by a computer, the computer program instructions adapting a computer to provide a value bearing indicium to a user via a computer network, the computer program instructions comprising:
generating a message digest by hashing relevant information;
generating a textual representation of a digital signature from the message digest;
generating a 2-D bar code comprising the relevant information;
generating the indicium, wherein the indicium includes the textual representation of the digital signature and the 2-D bar code; and
communicating the indicium from one of a plurality of stateless cryptomodules to one of a plurality of remotely located user computers, each stateless cryptomodule being programmable to service any of the plurality of remotely located user computers.

34. The computer-readable storage medium of claim 33, wherein:
the representation of the digital signature further includes a right side;
the 2-D bar code further includes a left side; and
the digital signature right side is adjacent to the 2-D bar code left side.

35. The computer-readable storage medium of claim 33, wherein:
the representation of the digital signature further includes a top side;
the 2-D bar code further includes a bottom side; and
the representation of the digital signature top side is adjacent to the 2-D bar code bottom side.

36. The computer-readable storage medium of claim 33, wherein:
the representation of the digital signature further includes a left side;
the 2-D bar code further includes a right side; and
the representation of the digital signature left side is adjacent to the 2-D bar code right side.

37. The computer-readable storage medium of claim 33, wherein:
the representation of the digital signature further includes a bottom side;
the 2-D bar code further includes a top side; and
the representation of the digital signature bottom side is adjacent to the 2-D bar code top side.

38. The computer readable storage medium of claim 33, wherein each stateless cryptomodule being programmable to service any of the plurality of remotely located user computers includes accessing user data from a database.

* * * * *